United States Patent Office 2,758,119
Patented Aug. 7, 1956

2,758,119

ALKYLATED HYDROQUINONE MONOGLYCIDYL ETHERS

Alan Bell, Kingsport, Tenn., assignor to Eastman Kodak Company, Rochester, N. Y., a corporation of New Jersey No Drawing. Application February 27, 1953, Serial No. 339,493

6 Claims. (Cl. 260—348)

The present invention relates to alkylated derivatives of hydroquinone monoglycidyl ether. More particularly, the invention is concerned with derivatives of hydroquinone monoglycidyl ether suitable for use as antioxidants and stabilizers for the prevention of thermal and oxidative degradation of plastic compositions, fats and oils.

Epoxy compounds of certain types are known to be valuable as stabilizers for plastic compositions. Hydroquinone bisglycidyl ether is one such compound. Alkylated hydroquinone monoethers are known to be suitable in certain instances as antioxidants for fats and oils. In the field of inhibition of various deleterious effects which appear in plastics, fats, oils and the like, terminology has been devised to denote various of certain actions believed to take place, many of which are highly theoretical. It is known, however, that the causes of these deleterious effects include heat, ultraviolet radiation, and oxidation. Sometimes the particular direct cause of a defect is not identifiable.

Of the effects which appear to be attributable to the several above-noted causes, one may list flow instability, discoloration, brittleness, checking or crazing, decrease in viscosity, and rancidity. It presently is the belief that with any given type of material, e. g. fat, oil, or plastic, certain of the above-mentioned effects are the result of certain specific ones of the above-mentioned causes. While it is difficult to resolve the various theories, it has been found that compounds useful to inhibit certain of these effects generally function with respect to only one particular effect or in connection with only one particular cause. That is to say, a material useful for inhibiting discoloration of plastics such as cellulose esters would not be found effective in reducing oxidation in oils and fats, nor as a matter of fact would it be found suitable for reducing bad effects of other types caused by heat in cellulose esters, e. g. flow instability. At the same time, a material suitable as an antioxidant in fats and oils would not be found suitable as an antioxidant in a plastic material, e. g. cellulose esters and polyvinyl chloride. In a cellulose ester plastic composition it therefore normally would be necessary to add an inhibitor to reduce heat flow, and a second inhibitor to reduce discoloration from heat. Discoloration resulting from ultraviolet radiation generally would necessitate the addition of a still further component, and perhaps a fourth additive might be necessary to prevent brittleness or ill-effects from oxidation.

I have discovered a novel class of chemical compounds which I have found to be highly valuable for the inhibition of the various effects outlined above. I have further discovered that these novel compounds are unique in their usefulness as effective inhibitors of the deleterious effects resulting from a plurality of causes.

It is an object of the present invention to provide a new class of chemical compounds and useful novel species within this class. It is another object of the present invention to provide compounds suitable for use as additives to repress the degradation of plastics, fats and oils due to heat, ultraviolet radiation and oxidation. Still another object of the invention is to provide novel compositions of matter including relatively small amounts of the novel inhibitors. Another object is to provide a stabilizer which is more compatible in plastic compositions including, among others, cellulose esters and polyvinyl chloride, than stabilizers of the prior art.

The invention contemplates new compounds comprising nuclear-mono-substituted monoglycidyl ethers of hydroquinone wherein the substituent is a monovalent non-olefinic hydrocarbon radical. Preferably, the new compounds comprise alkylated hydroquinone monoglycidyl ethers of the formula

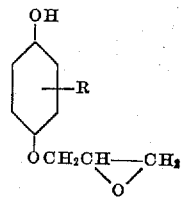

wherein R is a monovalent hydrocarbon radical of the formula

$R_1$, $R_2$, and $R_3$ being saturated alkyl radicals and R being a substituent of the group consisting of 2- and 3-positioned substituents. More advantageously, the invention resides in novel 2- or 3-tertiary butyl and -tertiary octyl derivatives of hydroquinone monoglycidyl ether.

In further accord with the invention, new compositions are prepared in which the novel compounds are employed as inhibitors, e. g. antioxidants and stabilizers, the compositions comprising fats, oils, plastics, e. g. cellulose esters and polyvinyl chloride, and the like containing inhibiting amounts of the novel compounds.

The novel compounds are prepared by the reaction of the hydrocarbon-substituted hydroquinone nucleus with epichlorhydrin in the presence of sodium hydroxide under conditions which will be described in the examples below. The reaction may be illustrated by the empirical equation for the production of tertiary butyl hydroquinone with epichlorhydrin in an aqueous alcohol solution containing a theoretical amount of sodium hydroxide, as follows:

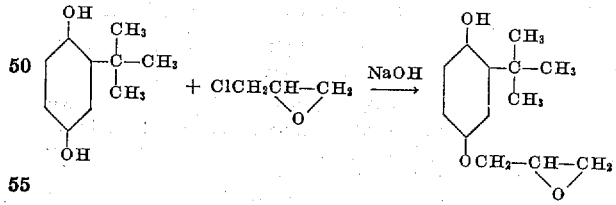

The invention is illustrated in the following examples.

*Example 1.—Preparation of 2-octyl-4(2,3-epoxypropoxy) phenol*

A mixture consisting of 250 parts of ethanol, 50 parts of 40 per cent aqueous sodium hydroxide (20 parts solid NaOH) and 0.5 part of zinc dust was heated to reflux under nitrogen. The mixture was stirred and 111 parts of octylhydroquinone was added, followed by slow addition of 92.5 parts of epichlorhydrin. The solution was stirred for one hour under reflux. The mixture was cooled, filtered, the filter cake washed with ethanol and the filtrate diluted with 2 volumes of water containing 3 parts of $Na_2S_2O_4$. The resulting mixture was extracted with ether. The ether extract was washed twice with 3 per cent sodium chloride solution and then dried over $MgSO_4$. The solvent was stripped off under vacuum.

The yield was 129 parts of a light amber colored, viscous oil which consisted essentially of 2-octyl-4-(2,3-epoxypropoxy) phenol. This compound was found to be compatible in the usual cellulose ester and polyvinyl chloride plastic compositions.

*Example 2.—Preparation of 2-tert-butyl-4-(2,3-epoxypropoxy) phenol*

Twenty-five parts of tert-butylhydroquinone was dissolved in 60 parts aqueous sodium hydroxide (containing 6.1 parts of technical NaOH). The reaction was carried out in a nitrogen atmosphere. This solution was treated with 14 parts of epichlorhydrin and left at room temperature for 24 hours. The product which had separated was washed with water, extracted with benzene, and the benzene removed under reduced pressure. The yield of product was 25 g. of a viscous oil which slowly crystallized. It consisted essentially of 2-tert-butyl-4-(2,3-epoxypropoxy) phenol. This compound was found to be compatible in the usual cellulose ester and polyvinyl chloride compositions.

*Example 3.—Inhibition of oxidation in lard*

The 2-octyl-4-(2,3-epoxypropoxy) phenol prepared in Example 1 was evaluated as an antioxidant in lard by the active oxygen method. The lard used was a 14.5-hour lard and the keeping quality in hours was 21 at 0.01 per cent and 40 at 0.02 per cent. A sample of commercial grade tert-butylhydroxyanisole antioxidant at similar concentrations in this lard gave values of 24 and 26.5.

*Example 4.—Inhibition of heat flow and heat discoloration in cellulose esters*

Samples of octylhydroquinone and tertiary butylhydroquinone monoglycidyl ethers, i. e. 2-(1,1,3,3-tetramethylbutyl)-4-(2,3-epoxypropoxy) phenol, and 2-tert-butyl-4-(2,3-epoxypropoxy) phenol were tested as stabilizers in cellulose ester compositions. The ether stabilizers tested comprised compositions consisting primarily of the 2-alkyl derivatives but containing small amounts of the 3-alkyl derivative isomers, the compositions being prepared as indicated in other examples herein. In these tests the cellulose ester employed was a filtered acetate-butyrate containing approximately 36.5% butyryl, approximately 13.1% acetyl and approximately 2.0 to 2.2% hydroxyl. This ester prior to addition of the stabilizer had a 24-second viscosity, a melting point of 204° C., a char point of 281° C., a density of 1.22 and a refractive index of 1.477. The acetate-butyrate was treated with a plasticizer (dibutylsebacate) and a flow stabilizer (potassium acid oxalate) was added. After incorporation of the ether additive of the invention, test specimens were formed by injection molding of the composition followed by the formation of punched pellets. The pellets were heated at 205° C. for an hour. For comparison to compositions containing prior art stabilizers, other test samples were made up using as stabilizers resorcinol bisglycidyl ether and p-tertiary butyl phenol. In the following tables which illustrate the utility of the novel compounds of the invention, entries have been abbreviated as follows:

OHMGE is tert-octylhydroquinone monoglycidyl ether
BHMGE is tert-butylhydroquinone monoglycidyl ether
PTBP is p-tertiary butyl phenol
RBGE is resorcinol bisglycidyl ether
KHOx is potassium acid oxalate The results reported as "flow, degrees F." indicate the temperature at which flow was observed to commence. The values for "color" in the original 1/8" plate are compared with APHA platinic chloride colored standards. After heating, the 1/2" pellets are compared with a set of standard heated Tenite pellets, which in turn are related back to the APHA colored standards. The color values on the original plates are compared with each other with the lower values representing less coloration. The values on the heated samples can only be compared with one another and not with the original plates. The values for "haze" are determined by comparison with a standard haze suspension of BaSO4.

In Table I, which shows the results of screening tests using salt-free ester, 100 parts of ester and 4 parts of plasticizer were used in each case.

TABLE I

| Run No. | Parts Stabilizer | Stabilizer | Parts KHOx | Original | | | 1-Hour Heat Test | | 2-Hour Heat Test | |
|---|---|---|---|---|---|---|---|---|---|---|
| | | | | Flow, °F. | Color | Haze | Flow, °F. | Color | Flow, °F. | Color |
| 1 | 0.0 | | .007 | 314 | 80 | 12 | 306 | 50 | 304 | 70 |
| 2 | 0.2 / 0.2 | PTBP / RBGE | .007 | 316 | 100 | 12 | 316 | 45 | 316 | 65 |
| 3 | 0.4 | OHMGE | .007 | 315 | 100 | 10 | 313 | 45 | 315 | 60 |
| 4 | 0.4 | BHMGE | .007 | 320 | 95 | 10 | 311 | 45 | 314 | 60 |
| 5 | 0.0 | | .015 | 318 | 85 | 20 | 312 | 50 | 309 | 65 |
| 6 | 0.2 / 0.2 | PTBP / RBGE | .015 | 315 | 105 | 20 | 315 | 45 | 316 | 60 |
| 7 | 0.4 | OHMGE | .015 | 318 | 100 | 20 | 315 | 45 | 314 | 55 |
| 8 | 0.4 | BHMGE | .015 | 322 | 100 | 20 | 316 | 45 | 313 | 65 |
| 9 | 0.0 | | .023 | 319 | 90 | 25 | 311 | 50 | 310 | 75 |
| 10 | 0.2 / 0.2 | PTBP / RBGE | .023 | 316 | 105 | 20 | 315 | 45 | 317 | 50 |
| 11 | 0.4 | OHMGE | .023 | 318 | 100 | 25 | 317 | 45 | 316 | 50 |
| 12 | 0.4 | BHMGE | .023 | 322 | 115 | 25 | 315 | 55 | 314 | 65 |

In Table II, the results are recorded for compositions employing 100 parts of cellulose acetate-butyrate of the type described above except that the acetate-butyrate was unfiltered and contained 11.8 parts of dibutylsebacate as the plasticizer.

TABLE II

| Run No. | Parts Stabilizer | Stabilizer | Original Flow, °F. | 1-Hour Heat Test | | 2-Hour Heat Test | |
|---|---|---|---|---|---|---|---|
| | | | | Flow, °F. | Color | Flow, °F. | Color |
| 1 | 0.0 | | 297 | 284 | 60 | 279 | 65 |
| 2 | 0.2 | PTBP | 295 | 289 | 60 | 275 | 70 |
| 3 | 0.2 / 0.2 | PTBP / RBGE | 296 | 293 | 50 | 293 | 60 |
| 4 | 0.2 | RBGE | 295 | 293 | 60 | 288 | 70 |
| 5 | 0.2 | BHMGE | 297 | 295 | 55 | 292 | 65 |
| 6 | 0.4 | BHMGE | 295 | 296 | 50 | 290 | 60 |
| 7 | 0.2 | OHMGE | 298 | 295 | 60 | 291 | 65 |
| 8 | 0.4 | OHMGE | 298 | 296 | 55 | 293 | 60 |

Table III reports the results obtained in a series of tests carried out as for Table II, but with higher concentrations of the octyl and butyl hydroquinone monoglycidyl ether inhibitors.

TABLE III

| Run No. | Parts Stabilizer | Stabilizer | Original Flow, °F. | 1-Hour Heat Test | | 2-Hour Heat Test | | Remarks—Original Plate |
|---|---|---|---|---|---|---|---|---|
| | | | | Flow, °F. | Color | Flow, °F. | Color | |
| 1 | 0.0 |  | 292 | 280 | 50 | 276 | 60 | Good color. |
| 2 | 0.2 | PTBP | 292 | 282 | 55 | 279 | 60 | Slight pink. |
| 3 | 0.2 | RBGE | 291 | 288 | 50 | 287 | 60 | Do. |
| | 0.2 | PTBP | | | | | | |
| 4 | 0.2 | RBGE | 290 | 287 | 50 | 287 | 55 | Do. |
| 5 | 0.25 | OHMGE | 291 | 287 | 50 | 286 | 55 | Very slight pink. |
| 6 | 0.50 | OHMGE | 292 | 289 | 50 | 288 | 60 | Do. |
| 7 | 0.75 | OHMGE | 290 | 288 | 50 | 286 | 55 | Slight pink. |
| 8 | 1.00 | OHMGE | 290 | 288 | 50 | 286 | 60 | Do. |

The results of the tests tabulated in Tables I, II, and III indicate that both octyl and butylhydroquinone monoglycidyl ethers are satisfactory in both flow stability and color stability. The octyl derivative was slightly better than the butyl derivative and better in inhibition of discoloration than the combination of p-tert-butyl phenol and resorcinol bisglycidyl ether and equal to these in flow stability.

The results listed in Table II indicate that at 0.2 part both the butyl and octyl derivatives are better in both color and flow stability than 0.2 part of resorcinol bisglycidyl ether. This result was unexpected since the bisglycidyl ether contains two glycidyl groups and consequently might perhaps be expected to be a more effective stabilizer.

*Example 5.—Light stabilization of polyvinyl chloride*

The octyl and butylhydroquinone monoglycidyl ethers were incorporated in polyvinyl chloride (prepared by the B. F. Goodrich Chemical Co. as Geon 101). The sheets used were 50 mil thick compounded from Geon 101 (100 parts) with 30 parts of dioctylphthalate. The compositions were tested using a modified Atlas Weather-Ometer at 140° F. The results obtained are reported in the following table:

| Additive | Hours Exposure Required for— | |
|---|---|---|
| | Slight Coloration | Bad Discoloration |
| None | 60 | 100 |
| 4 Parts OHMGE | 150 | 600 |
| 4 Parts BHMGE | 150 | 450 |

*Example 6.—Preparation of 2-octyl-4-(2,3-epoxypropoxy) phenol*

A mixture consisting of 111 g. (0.5 mole) of tert-octyl-hydroquinone, 350 cc. of 85% ethanol, 93 g. (1.0 mole) of epichlorhydrin, and 1 g. of zinc dust was stirred and heated to 70° C. Then over a 3 minute period 20 g. (0.5 mole) of sodium hydroxide as a 20% aqueous solution was added slowly. Stirring was continued for 1 hour longer at 70°. The reaction mixture was diluted with water, the organic layer taken up in benzene, and the benzene extract washed several times with saturated sodium chloride solution. The solvent was removed and the product distilled at 158–168° C. (0.1 mm.) to give 120 g. (85%) of an almost colorless oil which crystallized on standing. The product was analyzed for oxirane oxygen and found to contain 5.52% (theory 5.77%). The product was essentially 2-octyl-4-(2,3-epoxypropoxy) phenol but contained some of the 3-octyl derivative and probably a trace of the bisglycidyl ether. A portion of the material was recrystallized several times from hexane to give white crystals, M. P. 98–99° C. This was the pure 2-isomer.

*Example 7.—Preparation of 2-tert-butyl-4-(2,3-epoxypropoxy) phenol*

This product was prepared by means of a procedure as described for the octyl derivative in Example 6. The crude product was distilled at 154–162° C. (0.6 mm.) to give an almost colorless oil which crystallized on standing. The oxirane oxygen content of the product was found to be 6.81% (theory 7.2%). The product was essentially the 2-isomer but contained some of the 3-isomer. A portion of the material was recrystallized from benzene-hexane to give white crystals, M. P. 91–93° C. This product was analyzed and found to contain C, 69.82; H, 8.41 and oxirane oxygen, 7.07 (theory—C, 70.24; H, 8.14 and oxirane oxygen 7.2%). This was the pure 2-isomer.

*Example 8.—Inhibition of oxidation in lard*

The products prepared in Examples 6 and 7 as mixtures of 2- and 3-isomers were evaluated as antioxidants in lard by the active oxygen method. The lard used was a 13-hour lard. It exhibited a keeping quality in hours at 0.02 percent concentration of 25 for the octyl derivative and 27 for the tert-butyl derivative. A sample of commercial grade tert-butylhydroxyanisole antioxidant in the same lard exhibited a keeping quality of 25 hours when used in similar concentrations.

I claim:

1. A nuclear-mono-substituted monoglycidyl ether of hydroquinone having the formula

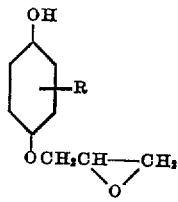

wherein R is a tertiary alkyl radical of less than 9 carbon atoms.

2. 2-tert-(lower)alkyl-4-(2,3-epoxypropoxy) phenol.
3. 3-tert-(lower)alkyl-4-(2,3-epoxypropoxy) phenol.
4. 2-tert.octyl-4-(2,3-epoxypropoxy) phenol.
5. 2-tert-butyl-4-(2,3-epoxypropoxy) phenol.
6. 2-(1,1,3,3-tetramethylbutyl)-4-(2,3-epoxypropoxy) phenol.

References Cited in the file of this patent

UNITED STATES PATENTS

| | | |
|---|---|---|
| 2,221,818 | Slagh | Nov. 19, 1940 |
| 2,457,300 | Boese | Dec. 28, 1948 |
| 2,467,171 | Werner et al. | Apr. 12, 1949 |
| 2,574,987 | Shelley | Nov. 13, 1951 |
| 2,595,619 | Voorthuis | May 6, 1952 |